United States Patent Office 3,210,300
Patented Oct. 5, 1965

3,210,300
PREPARATION OF POLYURETHANE FOAMS HAVING AN OPEN CELL, SKELETAL STRUCTURE
Henry J. Leibu and Edgar Tufts, Wilmington, Del., assignors to E. I. du Pont de Nemours and Company, Wilmington, Del., a corporation of Delaware
No Drawing. Filed Oct. 23, 1961, Ser. No. 147,032
10 Claims. (Cl. 260—2.5)

This invention relates to a process for preparing polyether-polyurethane skeletal foams and more particularly to a "one-shot" process for the preparation of open-celled resilient polyether polyurethane foams.

In general, foamed materials are found to be comprised of cells which can be described geometrically as dodecahedrons with pentagonal sides or faces. The bulk of the material in a foam resides in the strand-like structures which are found at the intersection of the faces of the cells. Only a small portion of the mass of a foam makes up the cell walls which are very thin, membrane-like films often called "windows." Resilient "one-shot" urethane foams have been described as having an interconnecting open-cell structure. This structure arises during the preparation of the foam at which time a small proportion of the cell membranes are ruptured. However, it has been found that the remaining cell membranes are sufficient in number to prevent almost completely the dynamic flow of gas or liquid through the foam.

It has been disclosed that skeletal foams which are suitable for use as filters can be prepared from either polyester urethane or polyether urethane resilient foam by dissolving the cell membranes in a separate post-treatment step. This process has the disadvantage that it requires additional treatment of the foam after its preparation. Because there is considerable interest in the use of open-cell urethane skeletal foam in the appliance and automotive industries, there is an incentive for the development of a new process to produce skeletal foams which would not involve a post-treatment step. Ideally, this process would make use of polyether polyols which are more economical than polyester polyols.

It is an object of the present invention to provide a method for preparing polyether polyurethane skeletal foams. A further object is to provide a method for preparing an open-celled resilient polyether polyurethane foam by a "one-shot" procedure. A still further object is to provide a "one-shot" polyether polyurethane skeletal foam which is useful as a filter medium. Other objects will appear hereinafter.

These and other objects of this invention are accomplished by providing a process for preparing an open-celled resilient polyurethane foam which comprises reacting a polyalkyleneether polyol having a molecular weight of from about 1000 to 6000 with an arylene diisocyanate in the presence of water, a tertiary amine catalyst and a water-soluble organo-silicone polymer, with the proviso that the reaction be carried out in the presence of from about 1 to 15 parts by weight per hundred parts by weight of said polyol of a cell regulator selected from the group consisting of (a) an alkylated amide, (b) a mixture of an amide and a low molecular weight aliphatic sulfoxide and (c) a mixture of an amide and a low molecular weight sulfone. The essence of the present invention resides in the use of a cell regulator in the formation of the polyurethane foam. The use of this material results in the formation of a substantially open-celled skeletal foam which is highly useful as a filter medium as well as being useful as a sponge, textile laminate and a clothing interliner.

The skeletal foams of the present invention are polyether polyurethanes and are made in a manner generally similar to that normally used for producing so-called "one-shot" polyurethane foams. A general discussion of urethane foam technology including the preparation of "one-shot" urethane foam is found in "Rubber Chemistry and Technology," vol. 33, pp. 1293–1322, 1960.

The polyalkyleneether polyols which may be used in this invention are polyalkyleneether glycols, polyalkyleneether triols and the polyalkyleneether polyols which are generally made by condensing alkylene oxides with low molecular weight aliphatic glycols or polyols such as ethylene glycol, 1,2-propylene glycol, glycerine, 1,2,6-hexanetriol, trimethylol propane, pentaerythritol and sorbitol. Condensation products of alkylene oxides with aminoalcohols such as ethanolamine and with diamines such as ethylenediamine can also be used. Polypropyleneether glycol and the triols obtained by condensing propylene oxide with glycerine, trimethylol propane and 1,2,6-hexanetriol are preferred. While polyols having an average molecular weight of from about 1000 to 6000 may be used in the present invention, molecular weights ranging from about 2000 to 4000 are preferred.

A wide variety of arylene diisocyanates may be used with the polyalkyleneether polyols described above. Representative examples of diisocyanates which may be employed are: toluene-2,4-diisocyanate, toluene-2,6-diisocyanate, 1,3-phenylene diisocyanate, cumene-2,4-diisocyanate, 5-chlorotoluene-2,4-diisocyanate, 4,4'-diisocyanato-diphenylmethane, 4,4'-diisocyanato - diphenylether, 1,5-naphthylene diisocyanate, 4,4'-diisocyanato-diphenyl and 3,3'- dimethyl - 4,4' - diisocyanato - diphenylmethane. Mixtures of diisocyanates may be employed if it is so desired. Of these diisocyanates, the toluene diisocyanates are particularly preferred and especially a mixture of about 80 parts of toluene-2,4-diisocyanate and 20 parts toluene-2,6-diisocyanate.

Water is provided in the reaction mixture for the generation of carbon dioxide gas which expands the foam. The water may also serve to form possible points for cross-linking the polyurethane. The amounts of polyalkyleneether polyol, arylene diisocyanate and water required in the present invention are to a certain extent dependent upon one another. At least one equivalent of isocyanate should be added for each equivalent of water and for each equivalent of polyalkyleneether polyol; that is, two —NCO groups for one molecule of water plus one —NCO group for each —OH group of the polyol. Generally, less than 1.1 equivalents of isocyanate for 1.0 equivalent of the combined water-polyalkyleneether polyol mixture are used for reasons of economy. The amount of water used is generally about 1 to 5 parts by weight based on 100 parts of polyalkyleneether polyol. Since water furnishes the carbon dioxide for expanding the foam, the density of the final foam is to a certain extent dependent on the quantity of water used. About 3 to 4 parts of water per 1000 parts of polyol are preferred for use with polyalkyleneether polyols in the preferred molecular weight range of about 2000 to 4000.

The foaming operation is carried out in the presence of a tertiary amine catalyst and, if desired, an organo tin catalyst, so as to promote the reaction of the isocyanate with water and the polyol. The tertiary amines catalyze both the urethane reaction and the water reaction of isocyanate. Examples of this type of catalyst are N-ethylmorpholine, 1,3-dimethylaminobutane and triethylenediamine. The organo tin catalysts are compounds such as dibutyl tin dilaurate and stannous 2-ethyl hexanoate. The tin catalysts are believed to accelerate the reaction of the isocyanate with the polyalkyleneether glycol. While "one-shot" foams can be made with the most active tertiary amine catalysts alone, it is customary to use mixtures of tertiary amines and tin compounds. In the present invention it is preferred to use about 0.1 to 0.3 part of triethylenediamine in combination with about 0.2 to 0.8 part of stannous 2-ethyl hexanoate per 100 parts of polyalkyleneether polyol.

In preparing polyether polyurethane foams by the "one-shot" technique, the use of surfactants is critical. In preparing the novel skeletal foams of this invention, about 0.5 to 2 parts of a water-soluble organo-silicone polymer may be used per 100 parts of polyalkyleneether polyol. These organo-silicone polymers are block polymers which may be obtained by condensing a polyalkoxy polysilane with the monoether of a polyalkyleneether glycol in the presence of an acid catalyst. The significant thing about these block polymers is the fact that they are water-soluble. For the purposes of the present invention they should have a molecular weight of from about 2800 to about 6000. These block polymers may be further described as being soft, low-melting waxes of viscous fluids.

The water-soluble organo-silicone block polymer has the structure

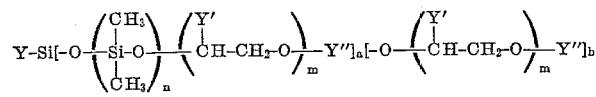

wherein Y is a lower alkyl radical; Y' is selected from the group consisting of hydrogen and methyl; Y'' is a lower alkyl radical; $a$ is an integer having a value of 1 to 3; $b$ is an integer having a value of 0 to 2; with the proviso that $a+b=3$; $n$ is an integer having a value so that the molecular weight of the block of recurring siloxane units is not greater than about 1500; $m$ is an integer having a value so that the molecular weight of the block of recurring oxyalkylene units ranges from about 750 to 2000; with the proviso that at least half the weight of the said oxyalkylene units shall be made up of oxyethylene units. It is preferred that about three-fourths of the total weight of the organo-silicone polymer be supplied by the oxyalkylene units.

These water-soluble organo-silicone polymers are prepared by reacting three molecules of the monoether of a polyalkyleneether glycol

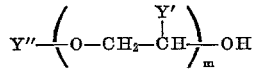

with a polysiloxane

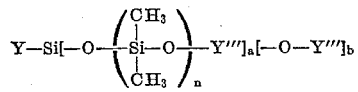

wherein Y''' is a lower alkyl radical and Y, Y', Y'', $a$, $b$, $m$ and $n$ have the significance defined above, in the presence of an acid catalyst. The condensation occurs with loss of the alcohol Y''' OH. The following equation illustrates a typical reaction:

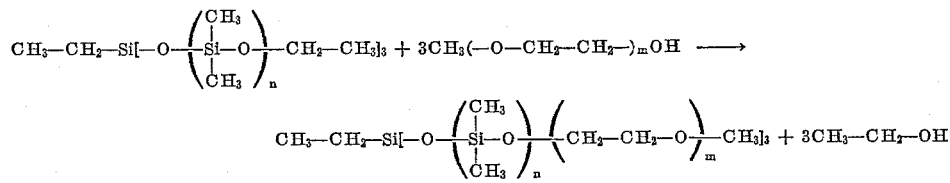

The reaction is carried out in a solvent such as toluene in which the reactants are mutually soluble. The reaction temperature should not exceed the reflux temperature of the solution to avoid side reactions. The catalyst may be an organic acid such as acetic acid or trifluoroacetic acid; about 0.1% by weight of the reactants is sufficient. The progress of the reaction can be followed by measuring the weight of distillate. After the reaction has been completed, the acid must be neutralized. Solid sodium bicarbonate may be used.

The polyalkoxy polysiloxane

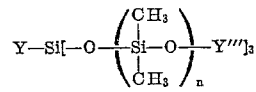

is made by equilibrating a trialkoxysilane with a polysiloxane such as the cyclic trimer or cyclic tetramer in the presence of an alkaline catalyst. The higher the proportion of the polysiloxane to the trialkoxysilane, the higher the molecular weight of the polyalkoxy polysiloxane.

These water-soluble organo-silicone block polymers are described in U.S.P. 2,834,748.

In addition to the block polymer surfactant, it is often desirable in the present invention to use a small quantity of a polydimethylsiloxane oil of 50 centistokes viscosity. Use of this surfactant causes the final foam to have a coarser structure and larger cells. Addition of more than 0.1 part of the 50 centistokes silicone oil will cause collapse of the foam. About 0.03 to 0.07 part of silicone oil per 100 parts of polyalkyleneether polyol is recommended if a coarse, highly porous foam is desired.

As indicated above, the essence of the present invention resides in the use of "cell regulators." These materials are alkylated amides or mixtures of amides with low molecular weight aliphatic sulfoxides or sulfones. The alkylated amides may be represented by the general structure

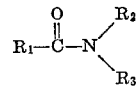

where $R_1$ is hydrogen or a lower alkyl radical, $R_2$ and $R_3$ are lower alkyl radicals, with the proviso that the substituents $R_2$ and $R_3$ may be the same or different or they may together form a ring which may also include a heteroatom such as O or divalent S. When $R_1$ is alkyl, it may form a ring together with $R_2$ or $R_3$. The following compounds are representative of the alkylated amides that may be used:

N,N,-dimethylformamide;
N,N-dimethylacetamide;
N-ethyl-N-methylacetamide;
N,N-di-n-butylformamide;
N-formylmorpholine;
N-methylpyrrolidone; and
N-acetylpyrrolidine.

N-methylpyrrolidone, N,N-dimethylacetamide, and especially N,N-dimethylformamide are preferred amides.

The amides which can be used in admixture with the sulfoxides or sulfones can be represented by the general formula given above; however, it is not necessary that the amides used in these mixtures be fully substituted so that $R_2$ and $R_3$ can now be represented by hydrogen as well as by alkyl radicals. The low molecular weight aliphatic sulfoxides which are useful in the mixed "cell regulators" may be represented by the following general formula:

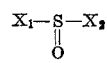

where $X_1$ and $X_2$ are lower alkyl radicals which may be the same or different or together may form a ring. The useful sulfones may be represented by the following general formula:

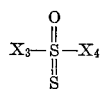

where $X_3$ and $X_4$ have the same meaning as $X_1$ and $X_2$ in the general formula presented above for the sulfoxides. Dimethyl sulfoxide, diethyl sulfoxide, tetramethylene sulfone and methyl ethyl sulfone are typical of the compounds which can be used in the "cell regulator" mixtures. Of these compounds, dimethyl sulfoxide is especially preferred. The mixtures of amides with sulfones or sulfoxides should contain about 30 to 70 parts amide per 100 parts of mixture. Mixtures containing about equal quantities of amide and sulfone or sulfoxide are preferred.

The quantity of "cell regulator" which is required to bring about the benefits of this invention ranges from about 1 to 15 parts by weight per 100 parts by weight of polyol. Below 1 part of "cell regulator" does not produce any significant change. Above about 15 parts, the foam becomes unstable during preparation and will often collapse. The range of about 7 to 12 parts of "cell regulator" per 100 parts of polyol is preferred. The greater the amount of "cell regulator" employed, the greater will be the permeability of the resulting foam as indicated by a decrease in the resistance to a dynamic flow of air through the foam. The increase in permeability with larger quantities of "cell regulator" appears to result from more complete removal of the membrane-like films or "windows" between cells.

In preparing "one-shot" foams by a batch procedure it is customary to form a mixture of polyol, water and, if desired, catalysts and surfactants to which is finally added a diisocyanate. After the diisocyanate has been added, the mixture is then poured into a suitable mold and allowed to foam. In carrying out the novel process of this invention, it is most convenient to add the "cell regulator" to the initial mixture of the polyol, surfactants, water and catalysts prior to the addition of diisocyanate. The diisocyanate is then added as before in the conventional process for batch "one-shot" polyurethane foam.

"One-shot" foams may also be made continuously in foam machines which simultaneously meter three or more streams of ingredients to a high-speed mixing head. The mixture emerging from the mixing head is directed into suitable molds or onto a moving belt. One technique commonly used in producing "one-shot" urethane foam continuously involves metering the following four streams to a mixing head:

Stream 1—Polyol (about 95% of the total required) plus silicone surfactant which is added to the polyol stream via a mix-T prior to the mixing head.
Stream 2—Polyol (about 5% of the total required) plus tin catalyst.
Stream 3—Water plus amine catalyst.
Stream 4—Diisocyanate.

In operating the novel process of this invention, it is preferable to mix the "cell regulator" with the major polyol stream or to introduce the "cell regulator" as a separate stream directly into the mixing head. However, the "cell regulator" can also be mixed with the stream containing water. In general, the "cell regulator" should not be mixed with the diisocyanate stream.

It has been found that foams of even greater permeability can be produced if the carbon dioxide which expands the foam is supplemented by another blowing agent. As a supplementary blowing agent, any fluid which does not react with the other ingredients present and which has a boiling point of about 20 to 50° C. may be used. Mixtures of such fluids may also be used. Fluorotrichloromethane is especially preferred as a supplementary blowing agent for use in the process of this invention. When a supplementary blowing agent is employed, it can be added to the mixture of polyol, surfactants, catalysts, and "cell regulator" prior to the addition of diisocyanate in the preparation of batch "one-shot" foam. If the supplementary blowing agent is used in continuous preparation of "one-shot" foam, it can be added to the polyol or the diisocyanate stream or fed as a separate stream to the mixing head. From about 1 to 15 parts by weight of supplementary blowing agent can be used per 100 parts by weight of polyol. The greater the amount of supplementary blowing agent, the greater will be the permeability of the resulting foam.

The foams which are prepared by the novel process of the present invention have a variety of uses. They are especially suitable as filter media for air and other gases. The foams can be cut to any desired dimensions or shapes in equipment which is normally used for cutting urethane foam. Filters can be made for use in air conditioners, automobile air vents, carburetor air intakes, etc. Due to the absence of most of their cell walls, these novel foams are also more useful than conventional "one-shot" urethane foams as sponges. Clothing interlinings or textile laminates made from these foams yield more comfortable wearing apparel because the highly permeable material permits the clothing to "breathe."

The following examples will better illustrate the nature of the present invention; however, the invention is not intended to be limited to these examples. Parts are by weight unless otherwise indicated.

The foams produced in the following examples are characterized by air flow measurements made by the procedure which follows:

A cylindrical sample of 1″ diameter and 0.5″ thickness is die-cut from the foam to be tested. The cylindrical sample is fitted into a tube having an inside diameter of 1″. Air is passed into the tube and through the foam and the rate of air flow is adjusted until a pressure drop of 18 mm. of water exists across the foam test piece. The flow of air required to produce this pressure drop is measured by a conventional laboratory rotameter and is expressed in cubic feet per minute. The more permeable the foam, the greater is the air flow required to produce the standard pressure drop of 18 mm. of water.

*Example 1*

To 100 parts of a triol having an average molecular weight of about 4000 (prepared by reacting one part of glycerine with about 42.5 parts of propylene oxide) is added in the order given; 1 part of a polydimethylsiloxane-polyalkyleneether block copolymer (made in accordance with the procedure of Example I(a) of U.S. 2,834,748); 0.4 part of stannous 2-ethylhexanoate; 0.15 part of triethylenediamine; 3.54 parts of water and various amounts of N, N-dimethylformamide. The mixtures are agitated thoroughly and then 43.0 parts of a mixture of 80 parts of toluene-2,4-diisocyanate and 20 parts of toluene-2,6-diisocyanate is added and thoroughly incorporated by vigorous mixing. As soon as the mixture begins to become creamy in appearance, it is poured into a suitable mold where it is allowed to foam. The foam is cured to a tack-free state by placing it in a 70° C. oven for 10–15 minutes. In this manner, foams are produced in the presence of 0, 1.0, 5.0, 8.0 and 12.0 parts of N,N-dimethylformamide. Air flow measurements are made with the results tabulated below:

| Parts N,N-dimethylformamide | 0.0 | 1.0 | 5.0 | 8.0 | 12.0 |
|---|---|---|---|---|---|
| Air Flow, c.f.m | 0.23 | 0.38 | 0.42 | 0.48 | 0.55 |

The results show that 1.0 part of "cell regulator" increases the permeability of the foam 65% and the increase in permeability is more pronounced at "cell regulator" levels of 8.0 to 12.0 parts.

Example 2

A series of 9 foams (2A–2I) is prepared in accordance with the recipe and procedure of Example 1, with the following exceptions that (a) 0.03 part of polydimethylsiloxane oil (50 cs. grade) is added to the polyol after addition of the polydimethylsiloxane-polyalkyleneether block copolymer and (b) varying amounts of fluorotrichloromethane are added just prior to the addition of diisocyanate.

Air flow measurements are made on the foams with the results tabulated below:

|  | 2A | 2B | 2C | 2D | 2E | 2F | 2G | 2H | 2I |
|---|---|---|---|---|---|---|---|---|---|
| N,N-Dimethylformamide, parts/100 parts triol | ---- | 8 | 8 | 8 | 8 | 12 | ---- | 12 | 12 |
| Trichlorofluoromethane, parts/100 parts triol | 7 | ---- | 3.5 | 7 | 14 | ---- | 14 | 7.0 | 14 |
| Air flow; c.f.m | 0.26 | 0.48 | 0.5 | 0.68 | 0.72 | 0.58 | 0.3 | 0.8 | 0.98 |

Samples 2A and 2G demonstrate the ineffectiveness of the supplementary blowing agent in the absence of "cell regulator." Samples 2B, 2C, 2D and 2E show the increase in permeability produced by increasing amounts of supplementary blowing agent in the presence of 8 parts of "cell regulator." In a similar fashion, samples 2F, 2H and 2I show the effect of supplementary blowing agent at a "cell regulator" concentration of 12 parts per 100 parts of polyol.

Example 3

Four foams (3A–3D) are prepared using the recipes and procedure of Example 1 with the exceptions that (a) 0.03 part of polydimethylsiloxane oil (50 cs. grade) is added as in Example 2 and (b) cell regulators and supplementary blowing agent are added as shown below:

Foam 3A:     Parts
  N,N-dimethylacetamide   9.2
  Fluorotrichloromethane   7.0
Foam 3B:
  N,N-dimethylacetamide   14.0
  Fluorotrichloromethane   14.0
Foam 3C:
  N-methylpyrrolidone   12.0
  Fluorotrichloromethane   14.0
Foam 3D:
  Acetamide   7.0
  Dimethylsulfoxide   8.0
  Fluorotrichloromethane   7.0

Air flow measurements are made on the foams with the following results:

| Sample | 3A | 3B | 3C | 3D |
|---|---|---|---|---|
| Air Flow, c.f.m | 0.4 | 1.2 | 1.04 | 0.5 |

Example 4

Three foams (4A–4C) are prepared in accordance with the recipe and procedure for foam sample 2D of Example 2, with the exception that the triol used is replaced by different polyols on an equal weight basis.

The polyols are as follows:

4A—A triol having an average molecular weight of about 4000 prepared by reacting 1 part of trimethlolpropane with 28.8 parts of propylene oxide 4B—A triol having an average molecular weight of about 3000 prepared by reacting 1 part of glycerine with about 31.6 parts of propylene oxide 4C—A diol having an average molecular weight of about 2000 prepared by polymerization of propylene oxide Air flow measurements made on the foams are as follows:

| Sample | 4A | 4B | 4C |
|---|---|---|---|
| Air Flow, c.f.m | 0.78 | 0.96 | 0.86 |

Example 5

This example illustrates the continuous preparation of the novel foams of this invention. Three foams (5A–5C) are prepared using the formulations tabulated below. Quantities shown are in parts by weight.

|  | 5A | 5B | 5C |
|---|---|---|---|
| Triol as in Example 1 | 100 | | |
| Triol as in Sample 2A | | 100 | 100 |
| Block copolymer as in Example 1 | 1.0 | 1.0 | 1.5 |
| Polydimethylsiloxane oil, 50 cs | 0.03 | 0.03 | |
| Stannous 2-ethylhexanoate | 0.5 | 0.4 | 0.4 |
| Triethylenediamine | 0.3 | 0.15 | 0.15 |
| Water | 3.54 | 3.54 | 3.54 |
| N,N-dimethylformamide | 8.0 | 8.0 | 8.0 |
| Fluorotrichloromethane | | 7.0 | 7.0 |
| Mixed toluenediisocyanates as in Example 1 | 43.0 | 43.0 | 43.0 |

The foams are prepared by bringing three streams together simultaneously in a high-speed mixing head. In all cases, one stream comprises the mixed toluene diisocyanates, the second stream comprises triethylenediamine dissolved in water in the proportions shown above, and the third stream comprises all of the other materials required by the above formulations in the quantities specified. Equipment which is suitable for metering and mixing the three streams is described in detail in Du Pont Elastomer Chemicals Bulletin HR–32, "Metering and Mixing Equipment for the Production of Urethane Foam Products," by S. A. Stewart, E. I. du Pont de Nemours and Company (Inc.), Wilmington, Delaware, September 1958.

The mixture of materials leaving the mixing head is directed into suitable containers, where it is allowed to foam and cure to a tack-free state. Measurements of air flow capacity are then made with the following results:

| Sample | 5A | 5B | 5C |
|---|---|---|---|
| Air Flow, c.f.m | 0.9 | 1.1 | 1.05 |

As many widely different embodiments of this invention may be made without departing from the spirit and scope thereof, it is to be understood that this invention is not limited to the specific embodiments thereof except as defined in the appended claims.

What is claimed is:

1. In the process for preparing an open-celled resilient polyurethane foam which comprises simultaneously reacting a polyalkyleneether polyol having a molecular weight of from about 1000 to 6000 with an arylene diisocyanate in the presence of water, a tertiary amine catalyst and a water-soluble organo-silicone polymer having a molecular weight of from about 2800 to 6000, said organo-silicone polymer having the structure

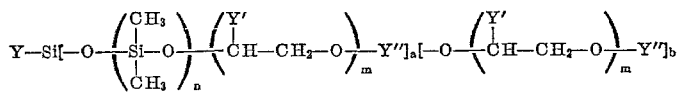

wherein Y is a lower alkyl radical; Y' is selected from the group consisting of hydrogen and methyl radical; Y" is a lower alkyl radical; $a$ is an integer having a value of 1 to 3; $b$ is an integer having a value of 0 to 2; with the proviso that $a+b=3$; $n$ is an interger having a value so that the molecular weight of the block of recurring siloxane units is not greater than about 1500; $m$ is an integer having a value so that the molecular weight of the block of recurring oxyalkylene units ranges from about 750 to 2000; with the proviso that at least half the weight of the said oxyalkylene units shall be made up of oxyethylene units; the improvement comprising carrying out the reaction in the presence of from about 1 to 15 parts by weight per 100 parts by weight of said polyol of a cell regulator selected from the group consisting of an alkylated amide of the formula (a)

wherein $R_1$ is selected from the group consisting of hydrogen and a lower alkyl radical and $R_2$ and $R_3$ are lower alkyl radicals; an alkylated amide of the formula (b)

wherein $R_4$ is selected from the group consisting of hydrogen and lower alkyl, $R_5$ and $R_6$ are lower alkylene radicals and X is selected from the group consisting of methylene, oxygen and sulfur; and an alkylated amide of the formula (c)

wherein $R_7$ and $R_9$ are lower alkylene radicals and $R_8$ is a lower alkyl radical.

2. The process of claim 1 wherein the polyalkyleneether polyol is polypropyleneether triol and the arylene diisocyanate is a mixture of toluene-2,4- and toluene-2,6-diisocyanate.

3. The process of claim 2 wherein the cell regulator is N,N-dimethylformamide.

4. The process of claim 2 wherein the cell regulator is N,N-dimethylacetamide.

5. The process of claim 3 wherein the cell regulator is N-methylpyrrolidone.

6. The process of claim 1 wherein fluorotrichloromethane is used as a supplementary blowing agent.

7. In the process for preparing an open-celled resilient polyurethane foam which comprises simultaneously reacting a polyalkyleneether polyol having a molecular weight of from about 1000 to 6000 with an arylene diisocyanate in the presence of water, a tertiary amine catalyst and a water-soluble organo-silicone polymer having a molecular weight of from about 2800 to 6000, said organo-silicone polymer having the structure

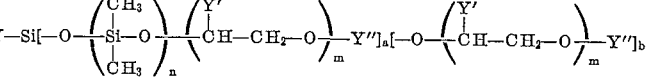

wherein Y is a lower alkyl radical; Y' is selected from the group consisting of hydrogen and methyl radical; Y'' is a lower alkyl radical; $a$ is an integer having a value of 1 to 3; $b$ is an integer having a value of 0 to 2; with the proviso that $a+b=3$; $n$ is an integer having a value so that the molecular weight of the block of recurring siloxane units is not greater than about 1500; $m$ is an integer having a value so that the molecular weight of the block of recurring oxyalkylene units ranges from about 750 to 2000; with the proviso that at least half the weight of the said oxyalkylene units shall be made up of oxyethylene units; the improvement comprising carrying out the reaction in the presence of from about 1 to 15 parts by weight per 100 parts by weight of said polyol of a cell regulator consisting of a mixture of from about 30 to 70 parts by weight of an amide and 70 to 30 parts by weight of a sulfoxide of the formula

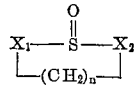

wherein $X_1$ and $X_2$ are selected from the group consisting of lower alkyl and lower alkylene radicals and $n$ is an integer from 0 to 1, the amide in said mixture being selected from the group consisting of (a)

wherein $R_1$, $R_2$ and $R_3$ are selected from the group consisting of hydrogen and a lower alkyl radical;

(b)

wherein $R_4$ is selected from the group consisting of hydrogen and a lower alkyl radical, $R_5$ and $R_6$ are lower alkylene radicals and X is selected from the group consisting of methylene, oxygen and sulfur; and (c)
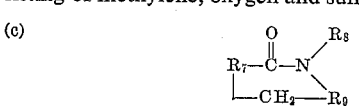

wherein $R_7$ and $R_9$ are lower alkylene radicals and $R_8$ is selected from the group consisting of hydrogen and a lower alkyl radical.

8. The process of claim 7 wherein the compounds in said cell regulator mixture are acetamide and dimethyl sulfoxide.

9. In the process for preparing an open-celled resilient polyurethane foam which comprises simultaneously reacting a polyalkyleneether polyol having a molecular weight of from about 1000 to 6000 with an arylene diisocyanate in the presence of water, a tertiary amine catalyst and a water-soluble organo-silicone polymer having a molecular weight of from about 2800 to 6000, said organo-silicone polymer having the structure

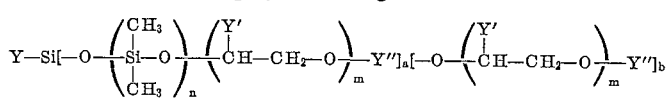

wherein Y is a lower alkyl radical; Y' is selected from the group consisting of hydrogen and methyl radical; Y'' is a lower alkyl radical; $a$ is an integer having a value of 1 to 3; $b$ is an integer having a value of 0 to 2; with the proviso that $a+b=3$; $n$ is an integer having a value so that the molecular weight of the block of recurring siloxane units is not greater than about 1500; $m$ is an integer having a value so that the molecular weight of the block of receiving oxyalkylene units ranges from about 750 to 2000; with the proviso that at least half the weight of the said oxyalkylene units shall be made up of oxyethylene units; the improvement comprising carrying out the reaction in the presence of from about 1 to 15 parts by weight per 100 parts by weight of said polyol of a cell regulator consisting of a mixture of from about 30 to 70 parts by weight of an amide and 70 to 30 parts by weight of a sulfone of the formula

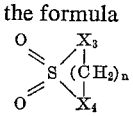

wherein $X_3$ and $X_4$ are selected from the group consisting of a lower alkyl and lower alkylene radicals and $n$ is an integer from 0 to 1, the amide in said mixture being selected from the group consisting of (a) 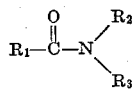

wherein $R_1$, $R_2$ and $R_3$ are selected from the group consisting of hydrogen and a lower alkyl radical;

(b) 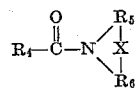

wherein $R_4$ is selected from the group consisting of hydrogen and a lower alkyl radical, $R_5$ and $R_6$ are lower alkylene radicals and X is selected from the group consisting of methylene, oxygen and sulfur; and c) 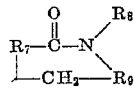

wherein $R_7$ and $R_9$ are lower alkylene radicals and $R_8$ is selected from the group consisting of hydrogen and a lower alkyl radical.

10. The process of claim 3 wherein fluorotrichloromethane is used as a supplementary blowing agent.

References Cited by the Examiner

UNITED STATES PATENTS

| | | | |
|---|---|---|---|
| 2,965,584 | 12/60 | Elkin | 260—2.5 |
| 3,002,937 | 10/61 | Parker et al. | 260—2.5 |
| 3,054,759 | 9/62 | Britain | 260—2.5 |

LEON J. BERCOVITZ, *Primary Examiner.*